(12) United States Patent
Wang et al.

(10) Patent No.: US 7,805,077 B2
(45) Date of Patent: Sep. 28, 2010

(54) SCALABLE AND MOVABLE DWDM USAGE OF CWDM NETWORKS

(75) Inventors: Steve Wang, San Jose, CA (US);
Johnny Zhong, Hayward, CA (US);
James Finn Aldridge, Palo Alto, CA (US)

(73) Assignee: Finisar Corporation, Sunnyvale, CA (US)

( * ) Notice: Subject to any disclaimer, the term of this patent is extended or adjusted under 35 U.S.C. 154(b) by 1377 days.

(21) Appl. No.: 10/889,333

(22) Filed: Jul. 12, 2004

(65) Prior Publication Data
US 2005/0025488 A1 Feb. 3, 2005

Related U.S. Application Data

(60) Provisional application No. 60/486,770, filed on Jul. 11, 2003, provisional application No. 60/493,242, filed on Aug. 7, 2003.

(51) Int. Cl.
*H04J 14/02* (2006.01)
(52) U.S. Cl. .............................. 398/85; 398/83; 398/82; 398/87; 398/67
(58) Field of Classification Search .................. 398/83, 398/59, 69, 50, 82, 85, 89, 79
See application file for complete search history.

(56) References Cited

U.S. PATENT DOCUMENTS

| | | | | | |
|---|---|---|---|---|---|
| 5,864,413 | A | * | 1/1999 | Feldman et al. | 398/72 |
| 6,973,268 | B1 | * | 12/2005 | Thompson | 398/42 |
| 7,254,330 | B2 | * | 8/2007 | Pratt et al. | 398/67 |
| 2001/0026385 | A1 | * | 10/2001 | Cao | 359/124 |
| 2002/0041413 | A1 | * | 4/2002 | Wang et al. | 359/128 |
| 2002/0105692 | A1 | * | 8/2002 | Lauder et al. | 359/124 |
| 2002/0110314 | A1 | * | 8/2002 | Connolly | 385/24 |
| 2002/0118417 | A1 | * | 8/2002 | Barry et al. | 359/127 |
| 2002/0196491 | A1 | * | 12/2002 | Deng et al. | 359/124 |
| 2003/0076560 | A1 | * | 4/2003 | Pratt et al. | 359/125 |
| 2003/0180045 | A1 | * | 9/2003 | Tajima | 398/42 |
| 2005/0025486 | A1 | * | 2/2005 | Zhong et al. | 398/79 |
| 2005/0084262 | A1 | * | 4/2005 | Oberg et al. | 398/19 |

OTHER PUBLICATIONS

U.S. Appl. No. 10/910,184, filed Aug. 2, 2004, James Finn Aldridge, et al.
U.S. Appl. No. 10/910,424, filed Aug. 2, 2004, Johnny Zhong, et al.

(Continued)

*Primary Examiner*—Ken N Vanderpuye
*Assistant Examiner*—Hibret A Woldekidan
(74) *Attorney, Agent, or Firm*—Workman Nydegger

(57) ABSTRACT

Systems and methods provide for the addition of DWDM modules to CWDM systems in order to increase bandwidth over existing lines. This allows for the expansion of communications capacity without the need to replace existing CWDM systems. The DWDM modules can be transparently inserted into the CWDM systems by, in the CWDM system, reserving a channels for use by the DWDM. The DWDM system then occupies that channel with a scalable number of DWDM wavelength channels, for example four, eight, or sixteen. The DWDM systems can be used in both single and dual fiber systems as well as ring systems. Use of single fiber systems is obtained by implementing coupling devices, such as interleavers, passband filters, and circulators, that can used in pairs to couple bidirectional signals over a single fiber.

12 Claims, 7 Drawing Sheets

OTHER PUBLICATIONS

U.S. Appl. No. 10/802,434, filed Mar. 17, 2004, James Finn Aldridge.

Aldridge, J., The Best of Both Worlds, [online] Sep. 2002 [retrieved on Oct. 23, 2002]. Retrieved from the Internet: URL:http://lwe.pennnet.com/Articles/Article_Display.cfm?Section=Articles&Subsection=Display&ARTICLE_ID=155526.

Bell, Robert, World Teleport Association, Intelligent Cities and TechSpace: What Lies Ahead [online] Feb. 2002, [retrieved on Nov. 7, 2002]. Retrieved from the Internet: URL:http://www.facilitycity.com/busfac/bf_02_02_intel.asp.

* cited by examiner

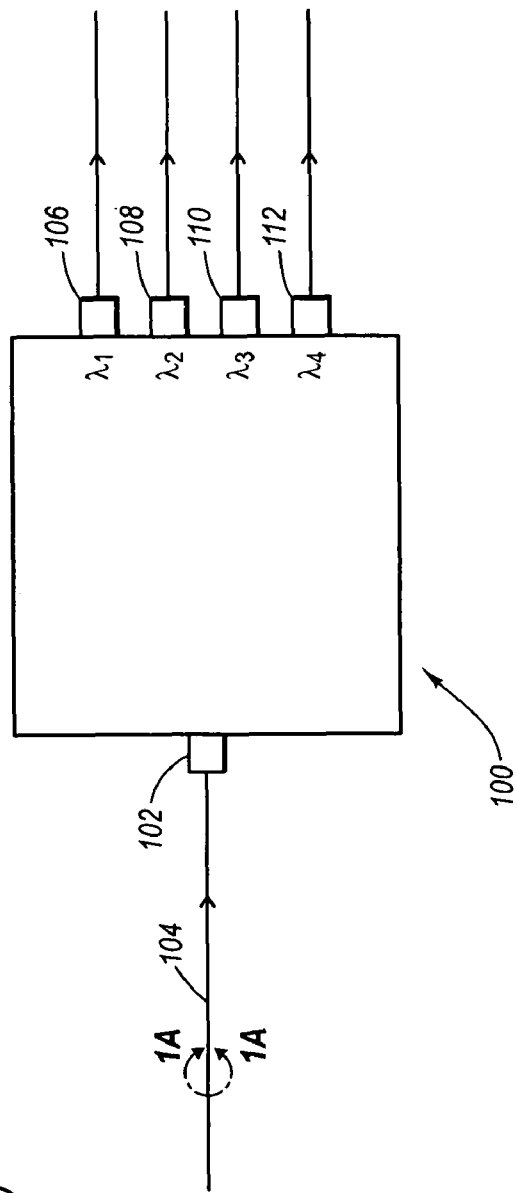
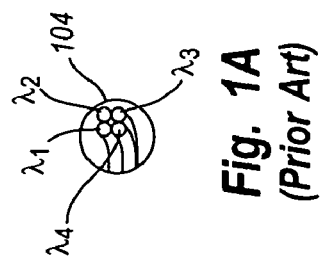
Fig. 1
(Prior Art)
Fig. 1A
(Prior Art)

SCALABLE AND MOVABLE DWDM USAGE OF CWDM NETWORKS

CROSS-REFERENCE TO RELATED APPLICATIONS

This application claims the benefit of U.S. Provisional Application No. 60/486,770, filed Jul. 11, 2003, and of U.S. Provisional Application No. 60/493,242, filed Aug. 7, 2003, both of which are hereby incorporated herein by reference in their entireties.

BACKGROUND OF THE INVENTION

1. The Field of the Invention

The present invention relates generally to multiplexed high speed communications systems, methods, and devices. More particularly, embodiments of the invention relate to systems and methods for transparently providing scalable and movable DWDM usage onto CWDM networks.

2. The Relevant Technology

Computer and data communications networks continue to develop and expand due to declining costs, improved performance of computer and networking equipment, the remarkable growth of the internet, and the resulting increased demand for communication bandwidth. Such increased demand is occurring both within and between metropolitan areas as well as within communications networks, such as wide area networks ("WANs"), metropolitan area networks ("WANs"), and local area networks ("LANs"). These networks allow increased productivity and utilization of and data, and the processing of voice, data, and related information at the most efficient locations.

Moreover, as organizations have recognized the economic benefits of using communications networks, network applications such as electronic mail, voice and data transfer, host access, and shared and distributed databases are increasingly used as a means to increase user productivity. This increased demand, together with the growing number of distributed computing resources, has resulted in a rapid expansion of the number of fiber optic systems required.

Through fiber optics, digital data in the form of light signals is formed by light emitting diodes or lasers and then propagated through a fiber optic cable. Such light signals allow for high data transmission rates and high bandwidth capabilities. Other advantages of using light signals for data transmission include their resistance to electro-magnetic radiation that interferes with electrical signals; fiber optic cables' ability to prevent light signals from escaping, as can occur electrical signals in wire-based systems; and light signals' ability to be transmitted over great distances without the signal loss typically associated with electrical signals on copper wire.

Another advantage in using light as a transmission medium is that multiple wavelength components of light can be transmitted through a single communication path such as an optical fiber. This process is commonly referred to as wavelength division multiplexing (WDM), where the bandwidth of the communication medium is increased by the number of independent wavelength channels used. To accomplish wavelength division multiplexing, several specialized optical components are used, including demultiplexers (demuxes), multiplexers (muxes), mux/demux modules, and optical add drop multiplexers (OADMs).

A demultiplexer generally takes as its input an optical transmission that includes a number of individual signals, with each signal being transmitted using a particular wavelength of light. An exemplary optical demultiplexer is shown in FIG. 1 and designated generally as 100. The optical demultiplexer 100 has an input port 102. The input port 102 receives a multiplexed transmission 104. In the present example, the multiplexed transmission 104 has four individual signals, each of different wavelengths, which are designated in this example as $\lambda 1, \lambda 2, \lambda 3,$ and $\lambda 4,$ as indicated in FIG. 1A. In this example, the optical demultiplexer 100 is a passive device, meaning that no external power or control is needed to operate the device. Although the optical demultiplexer 100 is a passive device, it should be noted that active devices can be used in optical demultiplexing as well. Using a combination of passive components, such as thin-film three-port devices, mirrors, birefringent crystals, etc., the optical demultiplexer 100 separates the multiplexed signal 104 into its constituent parts. Each of the individual wavelengths, each representing a separate signal on a communication channel, is then output to one of output ports 106, 108, 110, 112.

A multiplexer functions in the inverse manner as the demultiplexer. Multiplexers can often be constructed from demultiplexers simply by using the output ports 106, 108, 110, 112 as input ports and the input port 102 as an output port.

An optical device that combines the functionality of a demultiplexer and a multiplexer is known as a mux/demux. An exemplary mux/demux is shown in FIG. 2 and designated generally as 200. The mux/demux 200 has a multiplexed input port 202 that accepts as its input a multiplexed transmission 104. The multiplexed transmission 104 is separated into its constituent parts and output to demultiplexed output ports 204, 206, 208, 210. In a multiplexing operation, demultiplexed input ports 212, 214, 216, 218 accept as their input individual signals, with each signal being encoded on a different optical wavelength. The individual signals are combined into a multiplexed transmission and output to the multiplexed output 220 from output port 105.

An OADM is a component designed to extract an individual signal from the multiplexed transmission while allowing the remaining signals on the multiplexed transmission to pass through. The OADM also has an add port that can be used to remix the extracted signal with the multiplexed transmission or to transmit other data onto the fiber-optic network. An example of an OADM is shown in FIG. 3 and designated generally as 300. The OADM 300 is designed for bi-directional data communication. In optical networks, to distinguish the direction of data travel, the directions are referred to as east and west directions. In FIG. 3, data that travels in an easterly direction travels to the right of the OADM 300. Data the travels in a westerly direction travels to the left of the OADM 300.

Now illustrating the functionality of the OADM 300, a multiplexed transmission 104 is input into the east input port 302. The OADM 300 is designed for a specific wavelength or, more precisely, a band of wavelengths. For example, if the particular multiplexed transmission has four wavelengths, including a 1510 nanometer wavelength, a 1530 nanometer wavelength, a 1550 nanometer wavelength, and a 1570 nanometer wavelength, and the OADM 300 is designed to extract signals transmitted on the 1550 nanometer wavelength, the OADM may in fact extract any signal within a 12 nanometer bandwidth centered about the 1550 nanometer wavelength. As such, any wavelength between 1544 and 1556 nm is extracted by the OADM 300. In the present example, an individual signal 304 is extracted from the multiplexed transmission 104 and output to a device existing on the network, such as a network node 306, through the east drop port 308.

All other wavelengths remaining on a the multiplexed transmission continue through the OADM 300 and exit through an east output port 310, where they may continue to propagate on the fiber-optic network. If the OADM is a bi-directional module, such as OADM 300, a multiplexed transmission traveling in a westerly direction enters the OADM 300 at the west input port 318, drops the particular signal through the west drop port 320, adds a signal through the west add port 322, and propagates the remaining wavelengths through the west output port 324.

The network node 306 has two transceiver modules 312. In one embodiment, the transceiver modules may be GigaBit Interface Converters (GBICs). The transceiver modules 312 have input ports for accepting optical signals so that the signals can be converted to a data signal useful by the network node 306 and output ports for generating optical signals from the network node 306 so that data from the network node 306 may be propagated on the fiber-optic network. Optical signals from the network node 306 may be propagated onto the fiber-optic network such that they travel in an easterly direction by inputting the signals into the east add port 326 or propagated to the fiber-optic network, such that they travel in an westerly direction by inputting the signal signals into the west add port 322. By using an OADM that is bi-directional, redundancy may be added to the optical fiber network to provide for such contingencies as broken fibers in one of the directions. Optical add drop modules, such as OADM 300, are generally passive devices and are constructed using thin-film three-port devices, fused fiber devices, or other passive components.

A relatively high density of wavelengths can be transmitted using dense wavelength division multiplexing (WDM) and coarse wavelength-division multiplexing (CWDM) applications where the individual wavelength communication channels are closely spaced to achieve higher channel density and total channel number in a single communication line.

CWDM allows a modest number of channels, typically eight or less, to be stacked in the 1550 nm region of the fiber called the C-Band. CWDM transmission may occur at one of eight wavelengths: typically 1470 nm, 1490 nm, 1510 nm, 1530 nm, 1550 nm, 1570 nm, 1590 nm, 1610 nm. The channel spacing between each of the adjacent channels is 20 nanometers and the bandwidth of each of the channels is 12 nanometers. The 12 nanometer bandwidth means that the wavelength of a particular channel may vary up to six nanometers to either side of the nominal wavelength. Such an arrangement helps to prevent cross-talk between adjacent channels, such as that which occurs when the signals drift into an overlapping area.

Coarse wavelength division multiplexing systems, as the name implies, have relatively wide channel spacings. As such, more cost-efficient components that exhibit more wavelength drift may be used in the implementation of the network. Factors that can cause wavelength drift in the fiber optic network include temperature variations of the lasers transmitting the optical signals, temperature variations of the individual components that make up the network, and physical bending stresses on fibers within the optical network.

A second type of wavelength division multiplexing that may be used in a metro area network is DWDM (dense wavelength division multiplexing). As its name suggests, DWDM networks have much narrower channel spacings than CWDM networks, for example 0.8 nanometers or 0.8 nanometers. As such, more channels and hence more bandwidth can be provided on the network. The tradeoff for this higher network capacity is that more expensive components exhibiting less temperature stress and physical stress sensitivities must be used. Dense wavelength division multiplexing technology was originally intended for long-haul networks requiring hundreds of wavelengths built with expensive high-performance optics. Although DWDM systems provide superior scalability compared to CWDM systems, they do so at an increased cost per wavelength.

Although it is readily apparent that DWDM systems provide greater capacity than CWDM systems, CWDM systems are already installed throughout the world in a variety of networks. It would be relatively expensive to replace CWDM systems with DWDM systems, including transceivers, multiplexers, demultiplexers, and other devices in order to upgrade and obtain the greater capacity. This is particularly true considering the rapid development of data transfer technologies. It is therefore financially impractical to frequently update or replace legacy CWDM systems to support the most recent DWDM technologies.

Accordingly, there is a continuing need to increase data transfer capacity in communication systems. It would represent a significant advance in the art to be able to provide that increased capacity over existing systems.

BRIEF SUMMARY OF THE INVENTION

This invention relates generally to the addition of DWDM modules to CWDM systems in order to increase bandwidth over existing lines. This provides a relatively inexpensive method for the expansion of communications capacity without the need to replace existing CWDM systems. The DWDM modules can be transparently inserted into the CWDM systems by, in the CWDM system, reserving one or more channels for use by the DWDM. The DWDM system then occupies that single channel with a scalable number of wavelengths, for example four, eight, or sixteen. Thus, the present invention takes advantage of the cost-effective implementation of a CWDM system, while exhibiting the scalability available in DWDM systems.

The DWDM systems can be used in both single and dual fiber systems as well as ring systems. Use of single fiber systems is obtained by implementing coupling devices that can used in pairs to couple bidirectional ("BiDi") signals over a single fiber. These coupling devices may include, for example, interleavers, passband filters, and circulators.

Accordingly, a first example embodiment of the invention is a method for increasing data transmission capacity over an optical network. The method generally includes: reserving a CWDM channel over a first range of wavelength frequencies within a CWDM system, the CWDM system including an optical fiber operable to carry a CWDM optical signal; and inserting a multiplexed DWDM signal into the reserved CWDM channel on the first optical fiber. Optionally, the CWDM system is selected to be operable to transmit optical signals bidirectionally on the optical fiber such that DWDM signals are transmitted bidirectionally on the optical fiber between nodes including devices selected from passband filters and optical add drop multiplexers.

Another example embodiment of the invention is also a method for increasing data transmission capacity over an existing optical network. The method generally includes first providing an existing CWDM system which includes: a first CWDM multiplexer for multiplexing a first plurality of individual optical signals into a first multiplexed signal; a first CWDM demultiplexer for demultiplexing a second multiplexed signal into a second plurality of individual optical signals; and a signal coupling device for coupling the first multiplexed signal from a first fiber into a second fiber and coupling the second multiplexed signal from the second fiber to a third fiber that is in communication with the first CWDM demultiplexer, wherein the second fiber includes the first multiplexed signal and the second multiplexed signal traveling in opposite directions thereon. The method next includes: reserving a CWDM channel over a first range of wavelength frequencies; inserting, from a DWDM multiplexer via a first passband filter on the second fiber, a DWDM signal that is located within the first range of wavelength frequencies; and receiving, at a DWDM demultiplexer via a second passband filter on the second fiber, a DWDM signal over a second range of wavelength frequencies.

Yet another example embodiment of the invention is another method for sending dense wavelength division multiplexing signals on a CWDM infrastructure. The method generally includes: at a first optical add drop multiplexer, inserting a plurality of DWDM channels onto a first optical signal, wherein each of the DWDM channels is of a wavelength that can be superimposed on a bandwidth of a CWDM channel; and at a second optical add drop multiplexer in the CWDM infrastructure, retrieving the plurality of DWDM channels.

Still another example embodiment of the invention is a method for increasing data transmission capacity over an optical network. This method generally includes: reserving a CWDM channel over a first range of wavelength frequencies within a CWDM system, the CWDM system including an optical path for transmitting a CWDM optical signal; inserting a first passband filter into the optical path, the first passband filter operable to redirect multiplexed DWDM optical signals traveling over a first wavelength range to and from the optical path and a first set of DWDM devices; and inserting a second passband filter into the optical path, the second passband filter operable to redirect multiplexed DWDM optical signals traveling over the first wavelength range to and from the optical path and a second set of DWDM devices.

These and other objects and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which:

FIG. 1 illustrates an exemplary optical demultiplexer for use in wavelength division multiplexing fiber optic networks;

DETAILED DESCRIPTION OF THE PREFERRED EMBODIMENTS

Reference will now be made to the drawings to describe various aspects of exemplary embodiments of the invention. It is to be understood that the drawings are diagrammatic and schematic representations of such exemplary embodiments, and are not limiting of the present invention, nor are they necessarily drawn to scale.

In the following description, numerous specific details are set forth in order to provide a thorough understanding of the present invention. It will be obvious, however, to one skilled in the art that the present invention may be practiced without these specific details. In other instances, well-known aspects of network systems have not been described in particular detail in order to avoid unnecessarily obscuring the present invention.

As used herein, the terms "optical fiber" and "single fiber" are inclusive of other optical devices that may be interposed in a continuous optical path that commence and end with a single fiber. Hence, a "single fiber" may include a fiber stub that is attached at a first optical device, intermediate optical devices that sever the fiber, such as optical add drop multiplexers, yet nevertheless propagate at least some of the optical signals on the fiber, and a fiber stub that is attached to a second optical device. In other words, the recitation of a "single fiber" or an "optical fiber" between two nodes does not require the use of a single continuous fiber to span the entire distance between the nodes.

Figure 2:
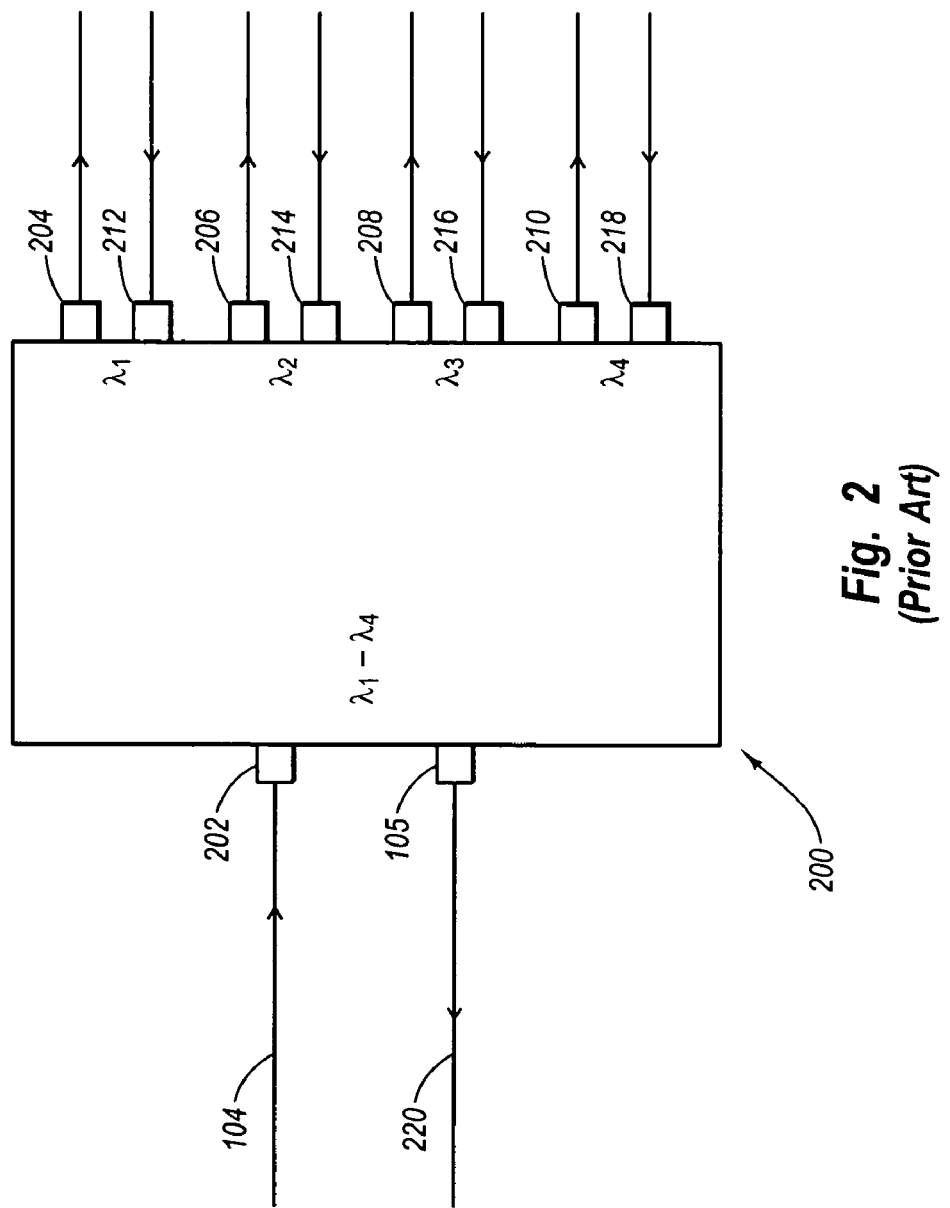
FIG. 2 illustrates a mux/demux for use in wavelength division multiplexing fiber optic networks.
Figure 3:
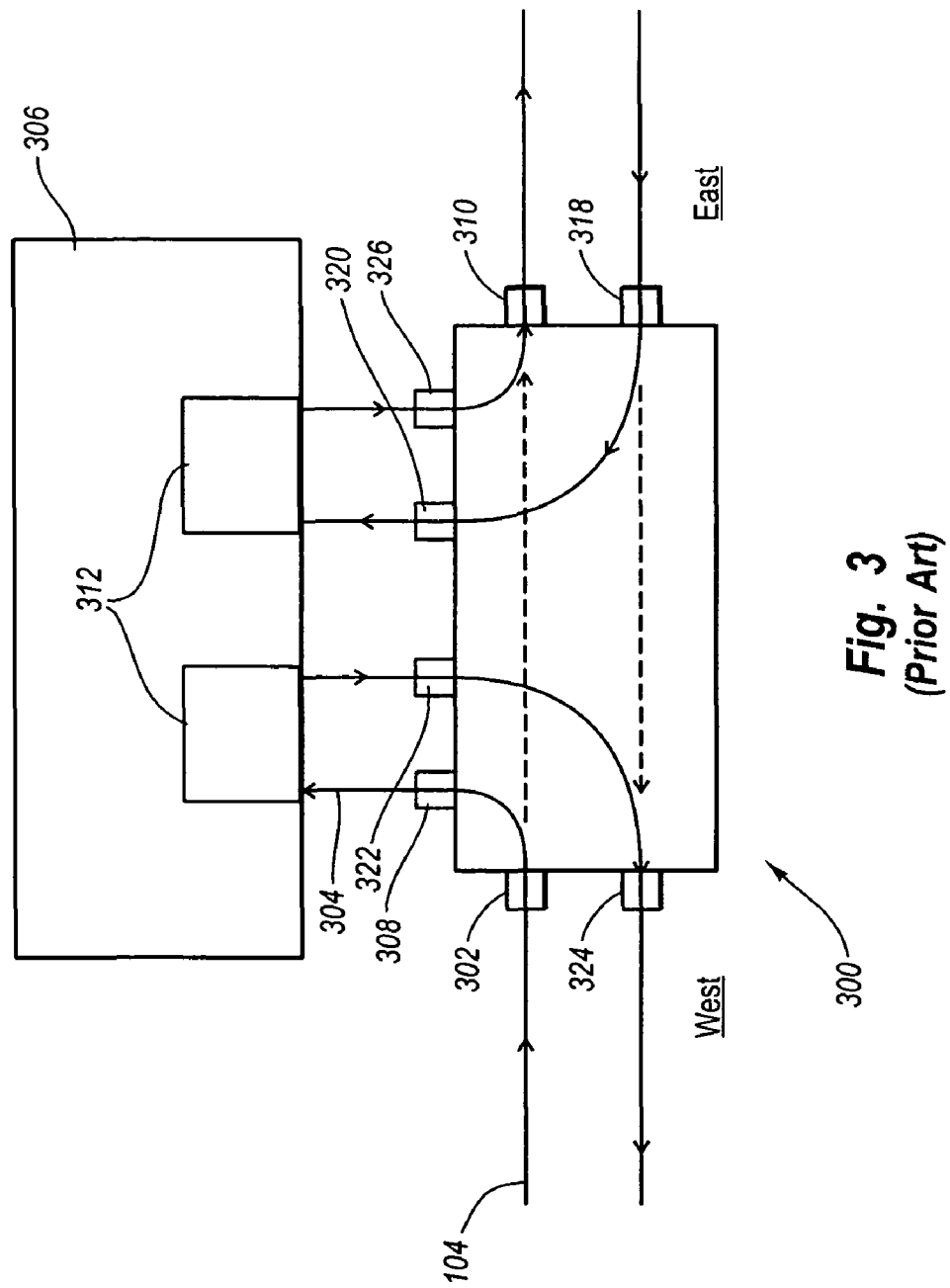
FIG. 3 illustrates an exemplary OADM for use in wavelength division multiplexing fiber optic networks.
Figure 4:
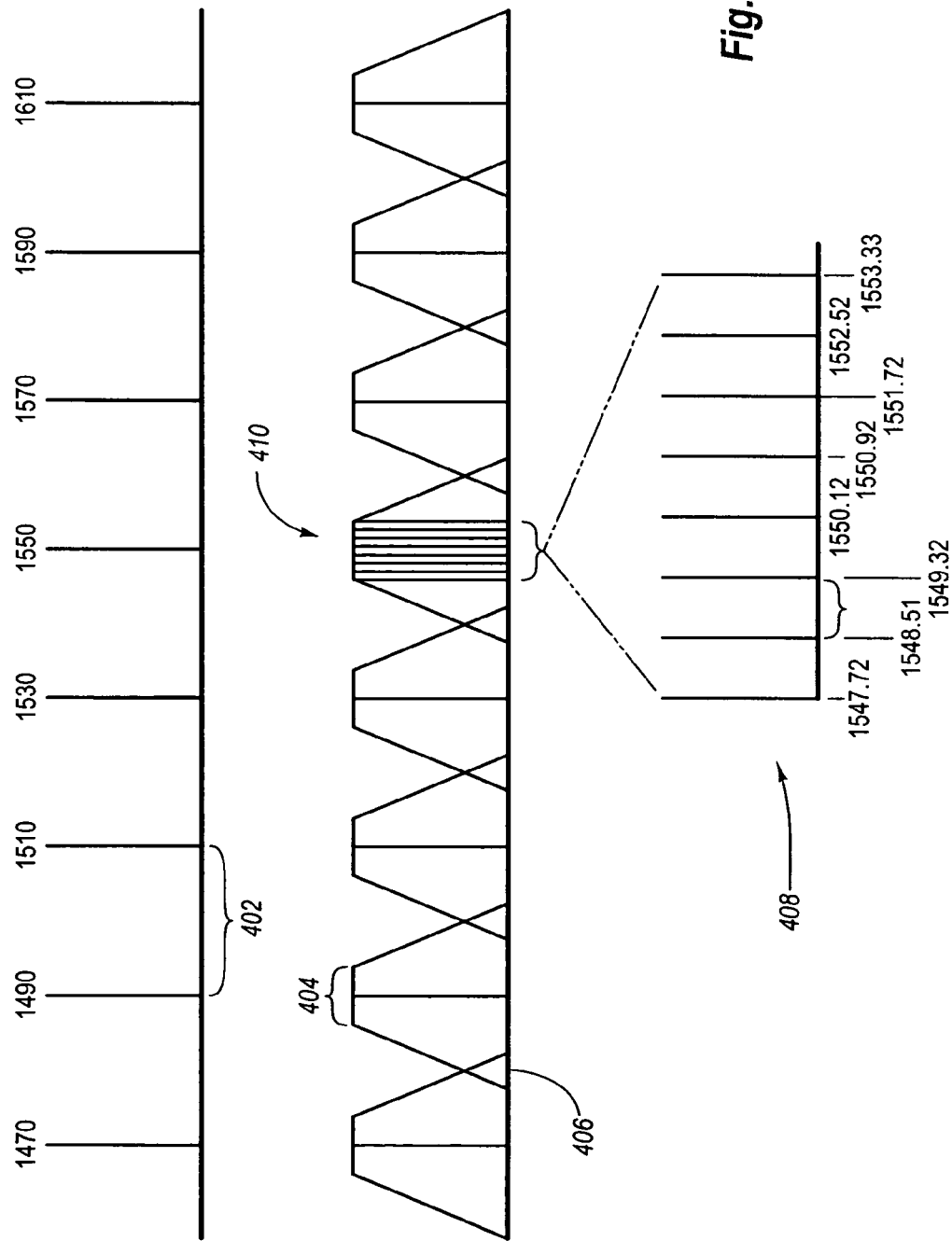
FIG. 4 is a graph depicting CWDM channel spacing, DWDM channel spacing, and DWDM channel spacing imposed within a single CWDM channel according to one embodiment of the invention.

Referring now to FIG. 4, depicted is a conceptual graph showing that CWDM transmission may occur at one of eight wavelengths: typically 1470 nm, 1490 nm, 1510 nm, 1530 nm, 1550 nm, 1570 nm, 1590 nm, and 1610 nm. The channel spacing 402 between each of the adjacent channels is 20 nanometers and the bandwidth 404 of each of the channels is 12 nanometers.

The present invention takes advantage of the cost-effective implementation of a CWDM system, while exhibiting the scalability available in DWDM systems. A general understanding of the principles involved in implementing DWDM on a CWDM system can be obtained by examining FIG. 4, which shows DWDM channels mapped onto the bandwidth of CWDM channels. As noted above, in the CWDM arrangement, the individual channels have a channel spacing 502 of 20 nanometers. Each channel bandwidth 504 is 12 nanometers.

A CWDM channel 410 is centered at 1550 nm with eight DWDM channels 408 superimposed thereon. As can be seen, because of the much narrower channel spacing of DWDM systems, a much greater number of DWDM channels can be added. Depending on the embodiment of DWDM implemented, various numbers of channels can be inserted and can occupy all or part of the CWDM channel. Thus, DWDM over CWDM is "scalable" in that desired scales of DWDM channels can be implemented as desired.

By using DWDM channels 408 superimposed over the bandwidth 404 of a CWDM channel, CWDM components can be used in combination with DWDM components to effectively increase the bandwidth of the metro area network by a factor of eight in one particular embodiment. For example, while eight channels is the maximum number available in a CWDM network, by superimposing eight DWDM channels over the CWDM channels, 64 channels can be achieved.

Figure 5:
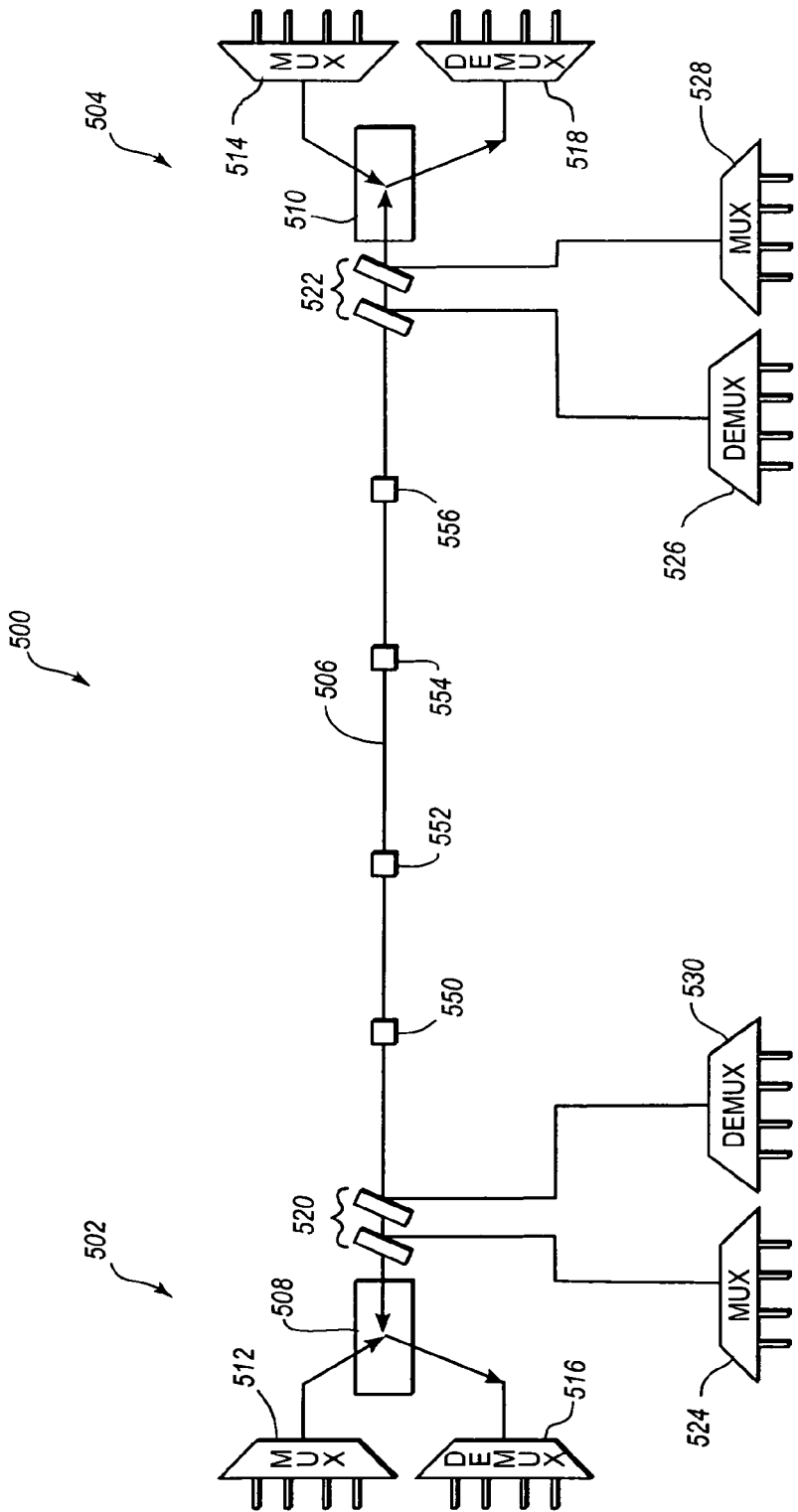
FIG. 5 illustrates a system for increasing capacity over CWDM systems using DWDM devices according to one embodiment of the invention.

Referring now to FIG. 5, one embodiment of a DWDM scalable and movable system inserted into a CWDM system is depicted. The DWDM over CWDM system 500 generally includes first and second CWDM multiplexer and demultiplexer pairs 502, 504 at either end of a single fiber line 506. A pair of coupling devices 508, 510 (described in greater detail below) couple traffic from multiplexers 512, 514 to line 506 and from line 506 to demultiplexers 516, 518. Thus, absent the use of the DWDM systems disclosed herein, the depicted CWDM system can carry four or eight coarse wavelength channels in either direction over single line 506, depending on the implementation of coupling devices 508, 510.

The DWDM systems are generally inserted by first reserving one (or more if desired) CWDM channels for use by the DWDM modules.

In one non-limiting example method for inserting optical signals over DWDM channels into the existing data path of line 506, a pair of C band filter pairs 520, 522 are placed on line 506 as desired, depending on the desired endpoints of the DWDM channel transmission. The passband filters may be either active passband filters that may require an external source of power for tunability and temperature stability or passive passband filters, requiring no external source of power and consisting only of passive components such as capacitors and inductors. If the CWDM 1550 channel is disabled, for example, each C band filter pair may include a C1 passband filter specific to the 1538 nm to 1548 nm range and a C2 passband filter specific to the 1552 nm to 1562 nm range. A first multiplexer 524 at one end of the line can then generate (together with the necessary transceivers) a first multiplexed signal over the C1 passband, for example to travel one direction down line 506. This first multiplexed signal is diverted at the far end of line 506 by one of the passband filters 522 to demultiplexer 526. Similarly, multiplexer 528 generates (together with the necessary transceivers) a second multiplexed signal over the C2 passband, to travel the opposite direction down line 506. This second multiplexed signal is in turn diverted at the far end of line 506 by one of the passband filters 520 to demultiplexer 530.

This DWDM over CWDM implementation is transparent to the regular CWDM traffic in that it occupies a channel spacing in the CWDM that was reserved for the DWDM. It is movable in that the entire DWDM system can be quickly and removably attached to a CWDM system via cables attached to the CWDM system at selected locations, along with the passband filters. The system is also scalable in that the reserved CWDM channel can be filled as desired depending on the capacity needs. For example, four, eight, or twelve DWDM channels can be fit within a single CWDM channel.

Examples of coupling devices 508, 510 include interleavers, passband filters, and circulators. An interleaver is a device used to combine odd and even numbered wavelengths from separate fibers into a single fiber. For example, in the absence of the DWDM system and the accompanying reservation of a CWDM channel, a multiplexer 512 can receives four odd numbered optical signals, $\lambda 1, \lambda 3, \lambda 5, \lambda 7$, from transceivers (not depicted) and couple the four signals, $\lambda 1, \lambda 3, \lambda 5, \lambda 7$, into a first multiplexed signal that is then communicated to the interleaver. The interleaver couples the first multiplexed signal onto line 506. The interleaver also receives a second multiplexed signal from line 506. The second multiplexed signal contains signals over the even numbered wavelengths $\lambda 2, \lambda 4, \lambda 6, \lambda 8$. This second multiplexed signal is coupled to demultiplexer 516, which divides the multiplexed signal into its component signals over wavelengths $\lambda 2, \lambda 4, \lambda 6$, and $\lambda 8$ and then couples each of the signals to an appropriate. In this manner, the interleaver passively couples unidirectional signals over two fibers to and from a single bi-directional fiber without mixing the signals. This enables the use of a single fiber for optical communication between business campuses, over LANs, MANs, LANs, and other networks rather than the conventional dual fibers that are used for the same purpose.

Similarly, a passband filter also couples unidirectional signals over two fibers to and from a single BiDi fiber without mixing the signals. Unlike an interleaver, however, a passband filter operates by allowing signals between two specific wavelength frequencies to pass, but discriminates against signals at other wavelength frequencies. Such a passband filter may be either an active passband filter and require an external source of power and employ active components such as transistors and integrated circuits or be a passive passband filter, requiring no external source of power and consisting only of passive components such as capacitors and inductors. Accordingly, a multiplexer 512 can multiplex four signals, $\lambda 1, \lambda 2, \lambda 3, \lambda 4$, into a first multiplexed signal and then communicate the multiplexed signal to the passband filter, which in couples the first multiplexed signal onto line 506. The passband filter also receives a second multiplexed signal from line 506. The second multiplexed signal contains signals over a second range of wavelength frequencies $\lambda 5, \lambda 6, \lambda 7, \lambda 8$. This second multiplexes signal is coupled to demultiplexer 516. Demultiplexer 516 divides the multiplexed signal into its component signals over wavelengths $\lambda 5, \lambda 6, \lambda 7, \lambda 8$ and then couples each of the signals to an appropriate transceiver. Thus, the passband filter passively or actively couples unidirectional signals over two fibers to and from a single line 506 without mixing the signals.

Next, a circulator also couples unidirectional signals over two fibers to and from a single line 506 without mixing the signals. A circulator is generally a passive device having three ports that couples light from port 1 to port 2 and from port 2 to port 3 while having high isolation in the other directions. In the described example the circulator does even-odd separation, although various forms of separation are possible.

More particularly, multiplexer 512 receives four optical signals, $\lambda 1, \lambda 3, \lambda 5, \lambda 7$, from four transceivers and couples the four signals, $\lambda 1, \lambda 3, \lambda 5, \lambda 7$, into a first multiplexed signal which is then communicated to the circulator. The circulator in turn couples the first multiplexed signal onto line 506 while having high isolation in the other directions. The circulator also receives a second multiplexed signal, containing signals over a second range of wavelength frequencies $\lambda 2, \lambda 4, \lambda 6, \lambda 8$, from line 506. This second multiplexed signal is coupled to demultiplexer 516 with a high degree of isolation in the other directions. Demultiplexer 516 divides the multiplexed signal into its component signals over wavelengths frequencies $\lambda 2, \lambda 4, \lambda 6, \lambda 8$ and then couples each of the signals to one of various transceivers. Thus, the circulator passively couples unidirectional signals over two fibers to and from a single line 506 without mixing the signals.

Circulators can also be used to double the per fiber capacity in BiDi systems. For example, in CWDM systems, instead of four channels per direction, eight channels per direction can be facilitated. This is performed by having a pair of circulators (e.g. coupling devices 508, 510) at either end of a single fiber (e.g. line 506) used for CWDM BiDi data transmission. The first circulator couples a first eight channel CWDM optical signal from multiplexer 512 to line 506 with high isolation in the other directions. Similarly, the second circulator couples a second optical signal from multiplexer 514 to line 506 with high isolation in the other directions. The first circulator also receives and couples the second optical signal from line 506 to demultiplexer 516 with high isolation in the other directions. Finally, the second circulator couples the first optical signal from line 506 to demultiplexer 518 with high isolation in the other directions. In contrast to the previous embodiments, however, circulators according to his embodiment enable the passage of the same wavelength channels in each direction. In this manner, circulators enable the use of BiDi transmission over a single fiber without sacrificing the number of channels.

One challenge that arises in using the pair of circulators to enable the double per fiber capacity is band cross talk due to optical reflection from connectors and receivers. According to the invention this problem can be overcome by using angled physical contact ("APC") connectors and controlling the receiver reflection by devices known in the art. An APC connector is a style of fiber optic connector with a 5°-15° angle on the connector tip for the minimum possible backreflection.

Optical add drop multiplexers ("OADMs") 550, 552, 554, 556 can be inserted along line 506 as communications nodes. Examples of such OADMs may include four port devices: with one port at each connection point to the main line for receiving and propagating the signal and two ports for connecting to transceivers for receiving data from the main line and adding data to the main line. The OADMs enable individual devices to connect to the line and access a single channel from the multiplexed signal on the line. Generally, OADMs are used at nodes, or connection points, to manage exchanges of data channel signals in an optical network. Particularly, an add/drop module may drop an unused channel of a multiplexed signal while simultaneously adding a different, appropriate channel. OADMs may interface directly with a computer to communicate Ethernet data from a fiber-optic network, in which case the OADMs are used to extract the channel of interest from the multiplexed optical signal. OADMs also may be employed in transceivers or some other nodes in a fiber optic network.

More specifically, OADMs extract from the multiplexed signal those channels that are to be used by a device in the network. This enables components on a network, such as two computers, to communicate over the same wavelength, or channel, of a fiber optic signal, without necessarily interrupting bandwidth dedicated to the other channels in the signal. For similar reasons, the add/drop module also can be used to insert the dropped channel back into the optical signal, or to include different data that is encoded on the same wavelength as the dropped channel.

Figure 6:
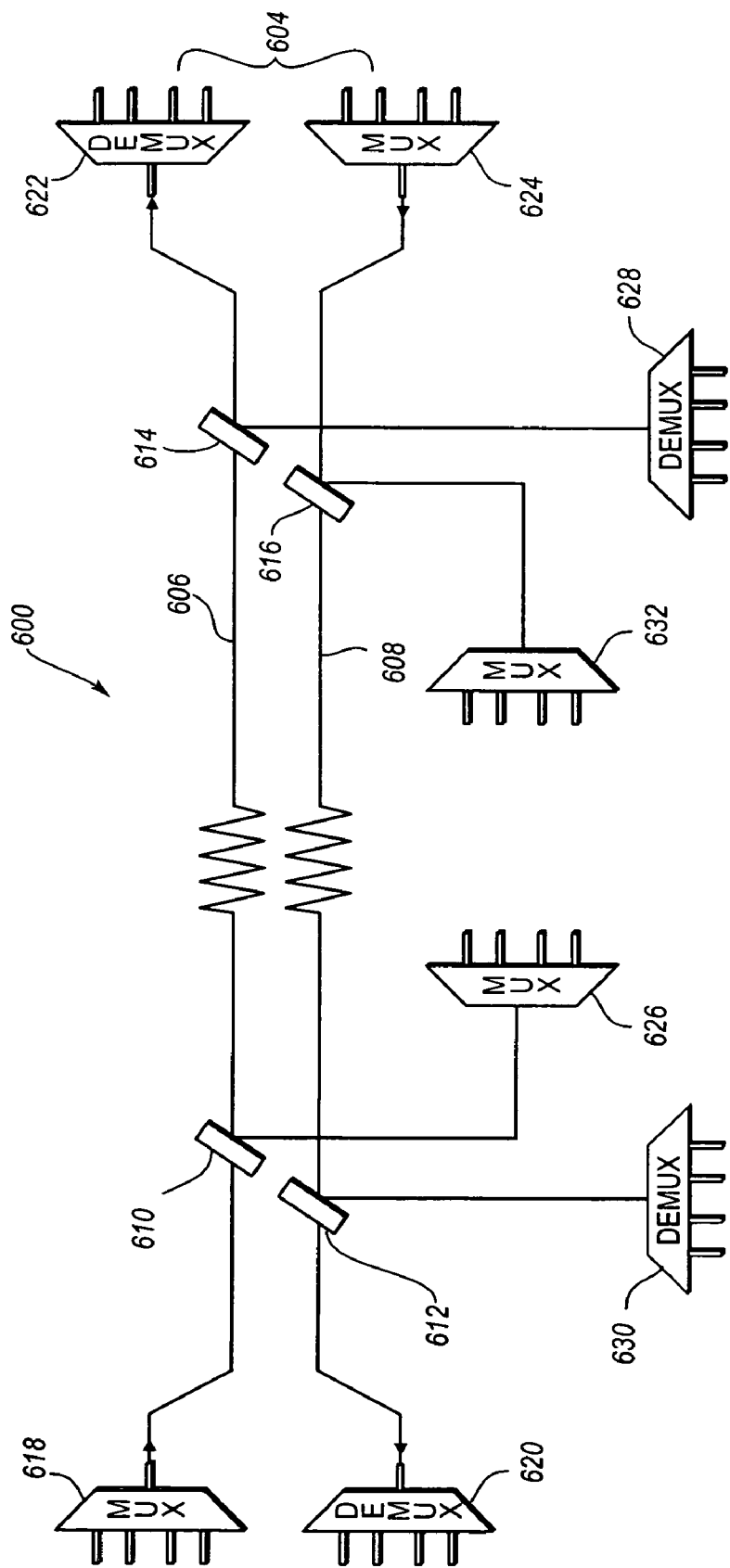
FIG. 6 illustrates another system for increasing capacity over CWDM systems using DWDM devices according to one embodiment of the invention.

Referring now to FIG. 6, depicted is a dual line CWDM system having DWDM modules inserted therein. This embodiment is substantially similar to the embodiment of FIG. 5, with the main differences being that two lines are used and no coupling devices are used so each line has unidirectional traffic, not bi-directional traffic. The DWDM over CWDM system 600 generally includes first and second CWDM multiplexer and demultiplexer pairs 602, 604 at either end of lines 606, 608. Thus, absent the use of the DWDM systems disclosed herein, the depicted CWDM system can carry up to eight coarse wavelength channels in either direction over lines 606, 608.

In the depicted embodiments, in order to insert DWDM channels into the data path of lines 606, 608, four C band filters 610, 612, 614, 616 are placed on lines 606, 608 at desired locations, depending on the desired endpoints of the DWDM channel transmission. The passband filters may be either be active passband filters and require an external source of power and employ active components such as transistors and integrated circuits or be passive passband filters, requiring no external source of power and consisting only of passive components such as capacitors and inductors.

If the CWDM 1550 channel is disabled, for example, a C band filter pair at each end of dual lines 606, 608 may include a C1 passband filter specific to the 1538 nm to 1548 nm range and a C2 passband filter specific to the 1552 nm to 1562 nm range. A first DWDM multiplexer 626 can then generate (together with the necessary transceivers) a first multiplexed signal over the C1 passband, for example to be directed one direction down line 606 by C1 passband 610. This first multiplexed signal is diverted at the far end of line 606 by C1 passband filter 614 to DWDM demultiplexer 628. Similarly, DWDM multiplexer 632 generates (together with the necessary transceivers) a second multiplexed signal over the C2 passband, to travel the opposite direction down lines 608. This second multiplexed signal is in turn diverted at the far end of line 608 by a C2 passband filter 612 to DWDM demultiplexer 630.

This DWDM over CWDM implementation is transparent to the regular CWDM traffic in that it occupies a channel spacing in the CWDM that was reserved for the DWDM. It is movable in that the entire DWDM system can be quickly and removably attached to a CWDM system via cables attached to the CWDM system at selected locations, along with the passband filters. The system is also scalable in that the reserved CWDM channel can be filled as desired depending on the capacity needs. For example, four, eight, or twelve channels can be fit within a single CWDM channel.

In addition, although not depicted in FIG. 6, OADMs as described above with respect to FIG. 5 can be inserted along lines 606, 608 as communications nodes as desired.

Figure 7:
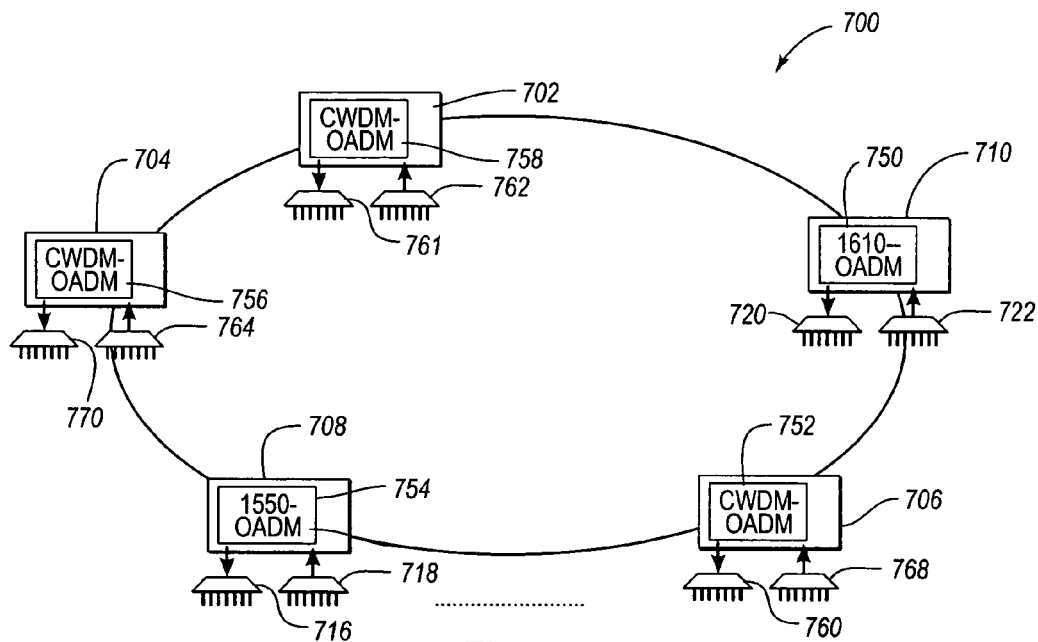
FIG. 7 illustrates yet another system for increasing capacity over CWDM systems using DWDM devices according to one embodiment of the invention.

A first exemplary configuration for implementing DWDM on a CWDM ring network is shown in FIG. 7, and designated generally as 700. The network 700 has a series of nodes 702, 704, 706, 708, 710 for example office buildings in a metro area network that are connected by a fiber optic ring. Each of the nodes 702, 704, 706 has an OADM 752, 756, 758 that is designed for a specific CWDM channel or optical wavelength. In FIG. 7, although the CWDM network has capacity for four CWDM channels, not each of the channels is used so that DWDM channels can be inserted into the channels and increase network bandwidth.

To accomplish this increase in bandwidth, DWDM components are added to the network at various points. More particularly, the CWDM components at the 1550 and 1610 nodes 708, 710 have been replaced by DWDM components. The 1550 and 1610 channels are selected for convenience in this embodiment because low cost Erbium-Doped Fiber Amplifier (EDFA) amplifiers are available for these channels. The addition of these components allows the network to transmit and receive DWDM signals superimposed over the bandwidth of CWDM channels. OADMs 750, 754 extract any wavelength of light within a selected bandwidth. DWDM mux/demuxes 716, 718, 720, 722 are used to further divide the superimposed DWDM channels into their constituent parts so that the individual DWDM channels may be routed to DWDM GBIC transceivers. The GBIC transceivers return data to the network through the DWDM mux/demuxes that multiplex the signals and return them to the network.

Alternatively, if a semiconductor based linear amplifier is used rather than an EDFA, then DWDM mux/demuxes can be used at each of the nodes in the CWDM network as desired to greatly increase bandwidth, as depicted in FIG. 7. Here, demultiplexers 760, 761, 770 and muxes 762, 764, 768 are inserted at nodes 702, 704, 706 to insert the DWDM channels at OADMs 752, 756, 758.

Figure 8:
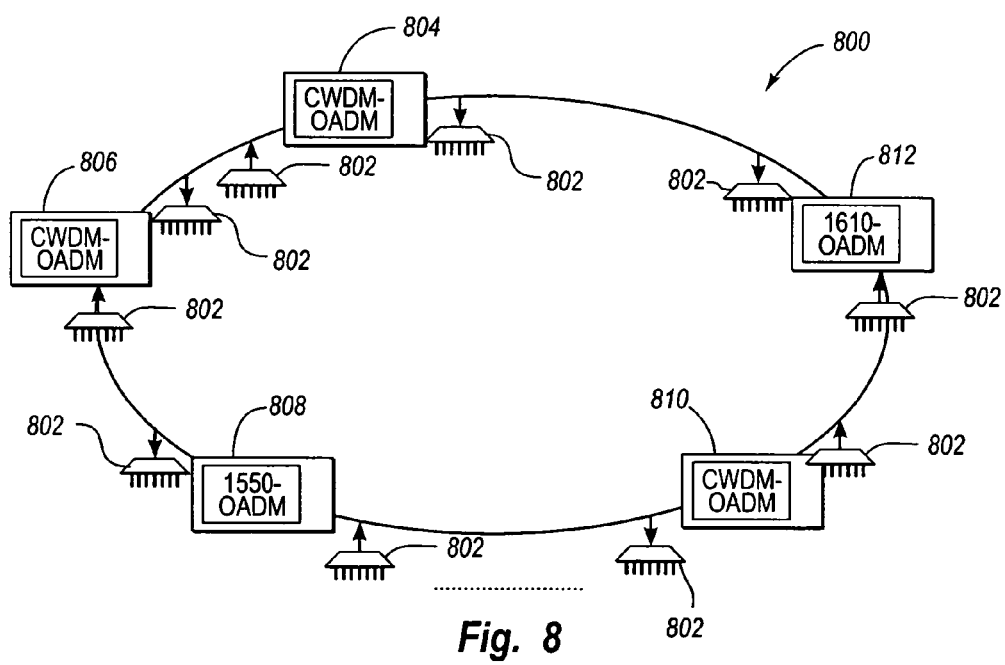
FIG. 8 illustrates another system for increasing capacity over CWDM systems using DWDM devices according to one embodiment of the invention.

Finally, in FIG. 8 the transparent insertion of DWDM OADMs over a CWDM network 800 is depicted. Whereas FIG. 7 illustrates the replacement of CWDM components with DWDM components in selected locations, the embodiment of FIG. 8 leaves the CWDM OADMs in place. Thus, mux/demux module pairs 802 can effect data transmission over selected DWDM channels that fall within one or more CWDM channels that are reserved on network 800. These DWDM channels pass transparently through CWDM OADMs 804, 806, 808, 810, 812 on the reserved CWDM channel.

By using pluggable DWDM transceivers, network designers can build low-cost CWDM networks and then scale the bandwidth with DWDM technology as the network grows. For example, using a 100 GHz DWDM pluggable transceiver, the network can be scaled to 64 wavelengths when using an eight wavelength CWDM system. Using a 50 GHz transceiver, 128 wavelengths can be implemented on the CWDM network. Using a 25 GHz transceiver, the network can be scaled to 256 wavelengths.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for increasing data transmission capacity over an optical network, comprising:
    receiving, at a first node on a first optical fiber, a first multiplexed CWDM optical signal in which a CWDM channel is reserved over a range of wavelength frequencies within a CWDM system, the first optical fiber being operable to carry the first multiplexed CWDM optical signal; and
    inserting a multiplexed DWDM signal into the reserved CWDM channel at the first node on the first optical fiber without demultiplexing the first multiplexed CWDM optical signal, wherein the multiplexed DWDM signal is inserted into the reserved CWDM channel via a first passband filter on the first optical fiber, the method further comprising the act of removing the multiplexed DWDM signal via a second passband filter on the first optical fiber, wherein the CWDM system comprises a legacy optical network, wherein the legacy optical network comprises:
    a CWDM multiplexer for multiplexing a first plurality of individual optical signals into the first multiplexed CWDM signal;
    a CWDM demultiplexer for demultiplexing a second multiplexed CWDM signal into a second plurality of individual optical signals; and
    a signal coupling device for coupling the first multiplexed CWDM signal from a second optical fiber into the first optical fiber and coupling the second multiplexed CWDM signal from the first optical fiber to a third optical fiber that is in communication with the CWDM demultiplexer, wherein the first optical fiber has the first multiplexed signal and the second multiplexed signal traveling in opposite directions thereon.

2. A method as in claim 1, wherein the multiplexed DWDM signal is inserted via an optical add drop multiplexer.

3. A method as in claim 1, further comprising the act of removing the multiplexed DWDM signal from the first optical fiber at a second node via an optical add drop multiplexer.

4. A method as in claim 1, wherein the first passband filter receives the multiplexed DWDM signal from a DWDM multiplexer and the second passband filter directs the multiplexed DWDM signal to a DWDM demultiplexer.

5. A method as in claim 1, wherein the first passband filter comprises a filter specific to a range selected from the about 1538 nm to about 1548 nm range and the about 1552 nm to about 1562 nm range.

6. A method as in claim 1, wherein the signal coupling device is selected from the group consisting of an interleaver, a passband filter, and a circulator.

7. A method as in claim 1, wherein the CWDM system is operable to transmit optical signals bidirectionally on the first optical fiber and DWDM signals are transmitted bidirectionally on the first optical fiber between nodes comprising devices selected from passband filters and optical add drop multiplexers.

8. A method as in claim 1, wherein the signal coupling device is a circulator having an angled physical contact connector to suppress optical reflection.

9. A method for increasing data transmission capacity over an optical network, comprising:
    providing a CWDM system, comprising:
        a CWDM multiplexer for multiplexing a first plurality of individual optical signals into a first multiplexed signal;
        a CWDM demultiplexer for demultiplexing a second multiplexed signal into a second plurality of individual optical signals; and
        a signal coupling device for coupling the first multiplexed signal from a first fiber into a second fiber and coupling the second multiplexed signal from the second fiber to a third fiber that is in communication with the CWDM demultiplexer, wherein the second fiber has the first multiplexed signal and the second multiplexed signal traveling in opposite directions thereon;
    reserving a CWDM channel over a first range of wavelength frequencies;
    inserting, from a DWDM multiplexer via a first passband filter on the second fiber, a DWDM signal onto the first multiplexed signal such that the DWDM signal is located within the first range of wavelength frequencies; and
    receiving, at a DWDM demultiplexer via a second passband filter on the second fiber, the DWDM signal.

10. A method for sending DWDM signals on a CWDM infrastructure, the method comprising:
    at a first optical add drop multiplexer, inserting a plurality of DWDM channels onto a first coarse wavelength division multiplexed signal without demultiplexing the coarse wavelength division multiplexed signal, wherein each of the DWDM channels is of a wavelength that can be superimposed on a bandwidth of a CWDM channel that is currently unused by the CWDM infrastructure; and
    at a second optical add drop multiplexer in the CWDM infrastructure, retrieving the plurality of DWDM channels without demultiplexing the first coarse wavelength division multiplexed signal, wherein the optical infrastructure comprises:
        a CWDM multiplexer configured to output the first coarse wavelength division multiplexed signal;
        a CWDM demultiplexer configured to receive a second coarse wavelength division multiplexed signal; and a signal coupling device selected from the group consisting of an interleaver, a passband filter, and a circulator for coupling the first coarse wavelength division multiplexed signal from a first fiber into a second fiber and coupling the second coarse wavelength division multiplexed signal from the second fiber to a third fiber that is in communication with the CWDM demultiplexer, wherein the second fiber has the first coarse wavelength division multiplexed signal and the second coarse wavelength division multiplexed signal traveling in opposite directions thereon.

11. A method as in claim 10, wherein the CWDM infrastructure is operable to transmit optical signals bidirectionally on an optical fiber and DWDM signals are transmitted bidirectionally on the optical fiber between the first optical add drop multiplexer and the second optical add drop multiplexer.

12. A method as in claim 10, wherein the first optical add drop multiplexer receives the plurality of DWDM channels from a DWDM multiplexer and the second optical add drop multiplexer directs the plurality of DWDM channels to a DWDM demultiplexer.

* * * * *